US007778888B2

(12) United States Patent
Daur et al.

(10) Patent No.: US 7,778,888 B2
(45) Date of Patent: Aug. 17, 2010

(54) METHOD FOR DYNAMICALLY AND AUTOMATICALLY SETTING UP OFFERINGS FOR IT SERVICES

(75) Inventors: Harald Daur, Esslingen (DE); Andrea Schmidt, Boeblingen (DE); Monika Illgner-Kurz, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 11/010,060

(22) Filed: Dec. 10, 2004

(65) Prior Publication Data
US 2005/0131773 A1    Jun. 16, 2005

(30) Foreign Application Priority Data
Dec. 11, 2003    (EP)    ................... 03104647

(51) Int. Cl.
    *G06F 17/30*    (2006.01)
(52) U.S. Cl. .......................... 705/27; 705/26
(58) Field of Classification Search ................ 705/27, 705/26
    See application file for complete search history.

(56) References Cited
U.S. PATENT DOCUMENTS
6,366,945 B1 *    4/2002    Fong et al. ................... 718/104
7,036,006 B2 *    4/2006    Bandhole et al. ............... 713/1

OTHER PUBLICATIONS
Virtual Computing; "Ready for Virtual Computing?" Info-Tech Advisor Newsletter, Dec. 9, 2002; Proquest #27293829, 4pgs.*

* cited by examiner

*Primary Examiner*—Robert M. Pond
(74) *Attorney, Agent, or Firm*—Cantor Colburn LLP; William Kinnaman (57) ABSTRACT

The inventive offering creation and validation (OCAV) component identifies all available resource types contained in a resource catalog, invokes a "get timetable" resource management action for each of those resource types, and finally receives a timetable containing all resource types with their assigned resources and their assigned free, reserved, and used time slots. By using that timetable, the OCAV component generates a new timetable including all resource types with their assigned resources having a common free time slots. Then, the OCAV component invokes a "get cost" resource management action for each resource type in that new timetable and assigns the calculated costs to the respective resource types, resulting in a final timetable. In further step, the OCAV component maps the free resource included in that final timetable to predefined service environments described in the resource catalog, and if the mapping has been successful, creates a list including all predefined service environments including their free time slots and costs. Finally, the OCAV component generates an offering for each of those SEs, assigns a price to each offering which is preferably calculated by certain business rules, and publishes it, preferably in a registry.

9 Claims, 6 Drawing Sheets

FIG. 1

PRIOR ART

FIG. 2A

The following example shows a sample extract of a XML file which describes an aggregate resource type.

```xml
<?xml version="1.0" encoding="UTF-8"?>
<resourcetype>
        <identification>
                <name>SECURE WEBSERVER</name>
        </identification>
        <expansion>
                <node>
                        <identification>
                                <name>HTTP FIREWALL</name>
                        </identification>
                </node>
                <node>
                        <identification>
                                <name>STANDARD WEBSERVER</name>
                        </identification>
                </node>
        </expansion>
</resourcetype>
```

FIG. 2B

The following example shows a sample extract of a XML file which describes a base resource type.

```xml
<?xml version="1.0" encoding="UTF-8"?>
<resourcetype>
        <identification>
                <name>HTTP FIREWALL</name>
        </identification>
        <partWSDL>
                <wsdlURL>http://localhost:8080/
                            FirewallServiceProvider.wsdl</wsdlURL>
        </partWSDL>
</resourcetype>
```

```xml
<?xml version="1.0" encoding="UTF-8"?>
<resourcesTimeTable>
    <resourceType>
        <identification>OperatingSystem</identification>
        <resource>
            <identification>zOS</identification>
            <freeTimeSlots>
               <slot>2003-11-01:00:00:00 - 2003-11-10:00:00:00</slot>
               <slot>2003-11-11:00:00:00 - 2003-11-13:00:00:00</slot>
            </freeTimeSlots>
            <usedTimeSlots>
               <slot>2003-11-10:00:00:00 - 2003-11-20:00:00:00</slot>
            </usedTimeSlots>
            <reservedTimeSlots>
               <slot>2003-11-20:00:00:00 - 2003-11-30:00:00:00</slot>
            </reservedTimeSlots>
        </resource>
        <resource>
            <identification>zLinux</identification>
            <freeTimeSlots></freeTimeSlots>
            <usedTimeSlots>
               <slot>2003-11-01:00:00:00 - 2003-11-30:00:00:00</slot>
            </usedTimeSlots>
            <reservedTimeSlots></reservedTimeSlots>
        </resource>
    </resourceType>
</resourcesTimeTable>
```

FIG. 3B

```xml
<?xml version="1.0" encoding="UTF-8"?>
<ResoureTypeFreeList>
    <resourceType>
        <identification>OperatingSystem</identification>
        <resource>
          <identification>zOS</identification>
          <freeTimeSlot>2003-11-01:00:00:00 - 2003-11-10:00:00:00</freeTimeSlot>
        <resource>
    </resourceType>
    <resourceType>
        <identification>Loadbalancer</identification>
        <freetimeSlot>2003-11-01:00:00:00 - 2003-11-10:00:00:00</timeSlot>
    </resourceType>
    <resourceType>
        <identification>WebServer</identification>
        <freetimeSlot>2003-11-01:00:00:00 - 2003-11-10:00:00:00</timeSlot>
    </resourceType>
</ResourceTypeFreeList>
```

FIG. 3C

```
<?xml version="1.0" encoding="UTF-8"?>
<resourcesCost>
    <resourceType>
        <identification>Firewall</identification>
        <resource>
           <identification>Cisco Firewall</identification>
           <freeTimeSlot>2003-11-01:00:00:00 - 2003-11-10:00:00:00</freeTimeSlot>
           <cost>40</cost>
        </resource>
    </resourceType>
    <resourceType>
        <identification>LoadBalancer</identification>
        <resource>
           <identification></identification>
            <freetimeSlot>2003-11-01:00:00:00 - 2003-11-10:00:00:00</timeSlot>
           <cost>50</cost>
        </resource>
    </resourceType>
    <resourceType>
        <identification>WebServer</identification>
        <resource>
           <identification>Apache</identification>
            <freetimeSlot>2003-11-01:00:00:00 - 2003-11-10:00:00:00</timeSlot>
            <cost>100</cost>
        <resource>
    </resourceType>
```

FIG . 3D

```
<?xml version="1.0" encoding="UTF-8"?>
<SEList>
    <SE name="Secure Clonable Webserver">
         <freeTimeSlot>2003-11-01:00:00:00 - 2003-11-10:00:00:00</freeTimeSlot>
         <cost>370</cost>
    </SE>
    <SE name="Clonable Webserver">
         <freeTimeSlot>2003-11-10:00:00:00 - 2003-11-20:00:00:00</freeTimeSlot>
         <cost>170</cost>
    </SE>
    <SE name="FastComputeServer">
         <freeTimeSlot>2003-11-30:00:00:00 - 2003-12-24:00:00:00</freeTimeSlot>
         <cost>1170</cost>
    </SE>
</SEList>
```

FIG . 3E

METHOD FOR DYNAMICALLY AND AUTOMATICALLY SETTING UP OFFERINGS FOR IT SERVICES

CROSS-REFERENCE TO RELATED APPLICATION

This application claims the priority benefit under 35 U.S.C. §119 of European patent application 03104647.7, filed Dec. 11, 2003, and incorporated herein by reference.

BACKGROUND OF THE INVENTION

1. Field of the Invention

The subject of the present invention relates to providing IT services to customers in general, and in particular how to dynamically and automatically set up offerings for IT services in order to optimize the rate of utilization of the service provider's existing resource infrastructure.

2. Description of the Related Art

In the traditional outsourcing business, customers who want to concentrate on their core business hand over their information technology (IT) business or at least parts of it to service providers who run the IT businesses of multiple customers. For each IT business the service provider has to define a service environment. The term "service environment" as used in the present patent defines all resources needed for a certain IT service to be provided to a customer, how to manage those resources in order to fulfill the conditions of the IT service, how to handle situations like resource shortages or resource overprovisioning, and the appropriate assigned resource management actions like configuring or installing of the resources. Each IT component within the service environment represents a so-called resource. For example a resource may be hardware (e.g. a server), software (e.g. application programs), a network with certain channel capabilities, disks, etc. In normal situations a lot of resources within the existing resource infrastructure are not used, however they cannot be provided to other customers.

In order to achieve a greater rate of utilization of the service provider's infrastructure it would be advantageous to create additional offerings in advance by identifying and using all free resources of the service provider's infrastructure independently of whether they are already assigned to a service environment.

The present application describes a method and system which dynamically sets up offerings for IT service by the service provider in order to optimize the rate of utilization of the service provider's existing resource infrastructure.

Offering an IT service encompasses the provisioning of that IT service on certain business conditions for either a mid-term or a long-term range. Normally, an IT service will be specifically created and offered for a specific customer based on an IT service agreement.

Based on that offering, the service provider has to build up the required service environment (SE) to fulfill the offered IT services.

In the state-of-the-art systems, the mapping of the offered IT service to the required service environment is either a static lookup of the corresponding resource management actions or a manual time-consuming creation of them. The first method is applicable for static environments, i.e. each provided IT service gets exactly the same SE. In case of parameterized offerings, the corresponding resource management actions have to be defined and/or adopted manually, which is a complex and therefore error-prone process. Typically the resource management actions are described by documentation, if at all, which lists the operator's tasks to be done in order to create and operate the customer's service environment. Some steps of automation have already been achieved using installation and configuration programs and/or scripts. However, that type of automation still requires some kind of manual processing, at least the selection and parameterization of these programs, and their execution at the requested point in time. Autonomous resource control systems require all kinds of resource management actions in a machine-readable form with defined syntax and semantics. The system creates and operates the SE according to defined rules and activities. The whole process of creation, operation and deletion of the SE must be supported by providing appropriate machine-readable task lists, rules for the dynamic allocation and deallocation of resources, and the SE-specific inter-component messaging (events and subscriptions).

The prior art offering creation process normally starts with the creation of an IT service offering. Then, a respective required service environment has to be built and assigned to that IT service.

A disadvantage of such a procedure is that all resources of the service provider's resource infrastructure which have been already assigned to respective service environments are normally excluded from the creation of a new offering independently of whether those resources have free time slots.

Starting from this, an object of the present invention is to avoid the disadvantage of the prior art and to improve the utilization of the service provider's infrastructure.

BRIEF SUMMARY OF THE INVENTION

The inventive Offering Creation and Validation (OCAV) component identifies all available resource types contained in the resource catalog, invokes a "get timetable" resource management action for each of those resource types, and finally receives a timetable containing all resource types with their assigned resources and their assigned free, reserved, and used time slots.

By using that timetable, the OCAV component generates a new timetable including all resource types with their assigned resources having common free time slots. Then, the OCAV component invokes a "get cost" resource management action for each resource type in that new timetable, and assigns the calculated costs to the respective resource types resulting in a final timetable.

In a further step, the OCAV component maps the free resources included in that final timetable to predefined service environments described in the resource catalog, and if the mapping has been successful, creates a list including all predefined service environments including their free time slots and costs. Finally, the OCAV component generates an offering for each of those SEs, assigns a price to each offering, which is preferably calculated by certain business rules, and publishes it, preferably in an offering catalog. There are different types of offering catalogs: public, semi-public and private.

A preferred embodiment of the present invention is to use the present invention to dynamically create short-term offerings for predefined service environments that are specifically configured for short-term offerings. Those service environments are indicated by a short-term identifier.

Those short-term offerings will be priced with special attractive conditions comparable to last-minute travel offerings or standby tickets in the airline industry.

Examples for such short-term offerings are Web server environments only needed for special promotion activities, or BioGrid environments that are usually needed for short-term, heavyweight calculations.

BRIEF DESCRIPTION OF THE DRAWINGS

The above, as well as additional objectives, features and advantages of the present invention will be apparent in the following detailed written description.

The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

FIG. 3B shows a sample of a timetable in XML which may be used by the present invention.

FIG. 3C shows a sample of a new timetable in XML including all resource types with their assigned resources having a common free-time slot.

FIG. 3D shows a sample of a final timetable in XML which may be used by the present invention.

FIG. 3E shows a sample of the result of the mapping step.

DETAILED DESCRIPTION OF THE INVENTION

Figure 1:
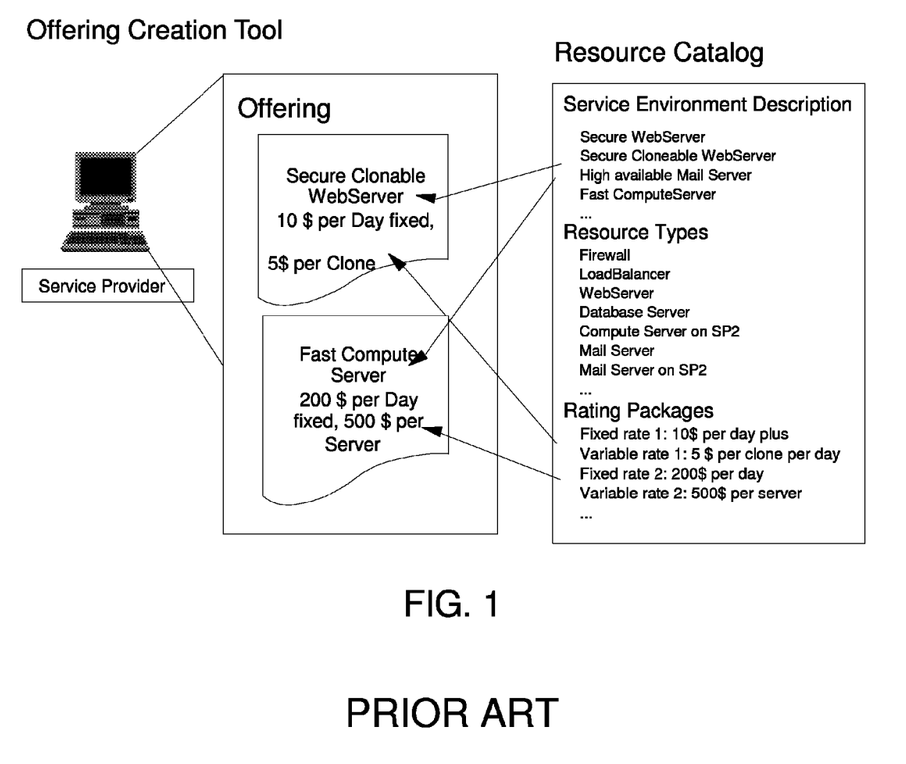
FIG. 1 shows a prior art offering creation tool.
Figure 2A:
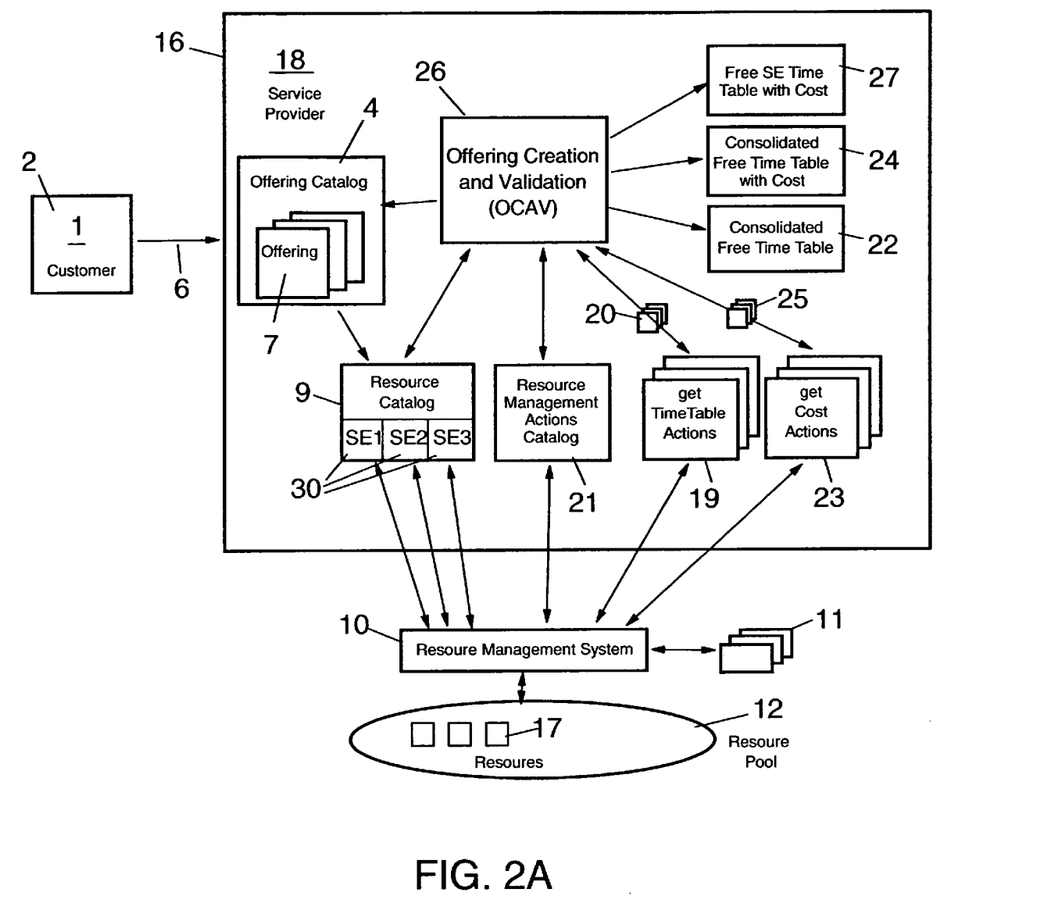
FIG. 2A shows the inventive Offering Creation and Validation (OCAV) component with its communicating components, e.g. a resource catalog.

With respect to FIG. 2A, there is depicted the inventive Offering Creation and Validation (OCAV) component with its communicating function components.

The new and inventive component of the present invention is the OCAV component 26, which is preferably part of the service provider's resource infrastructure or pool of resources 12.

The OCAV component 26 is preferably implemented in a client-server architecture in which the customer 1 uses a client system 2 with an operating system like Microsoft Windows and an Internet browser like Netscape Navigator, while the service provider 18 uses a server system 16 like an IBM pSeries with an operating system like IBM AIX, an application server like IBM WebSphere Application Server, and a Web server. The server 16 of the service provider 18 has access to a pool of resources 12 like hardware, programs, networks, disks etc. via a resource management system 10 and its standard resource management actions 11. The pool of resources 12 may be owned and managed by the service provider 18 himself, or the service provider 18 may use another service provider's pool of resources. The customer 1 preferably communicates with the service provider 18 via a communication protocol 6 like HTTP/TCPIP.

Contrary to the prior art systems, the OCAV component 26 does not require the existence of offerings 7 at all, but only requires the existence of already defined service environments (SEs) 30 that are described in the resource catalog 9. Only when those service environments 30 map to identified free resources 17 can new offerings 7 for those service environments 30 be created and published.

The process steps carried out by the inventive OCAV component 26 may be briefly summarized as follows:

The inventive OCAV component 26 identifies all available resource types contained in the resource catalog 9, invokes a getTimeTable resource management action 19 for each of those resource types, and finally receives timetables 20 for all resource types containing their assigned resources and their assigned free, reserved, and used time slots. By using these timetables 20, the OCAV component 26 generates a new consolidated timetable 22 including all resource types with their assigned resources having common free time slots. Then, the OCAV component 26 invokes a getCost resource management action 23 for each resource type in that new consolidated timetable 22, and assigns the calculated costs to the respective resource types resulting in a final consolidated timetable 24.

In further step, the OCAV component 26 maps the free resources included in that final consolidated timetable 24 to predefined service environments 30 described in the resource catalog 9, and if the mapping has been successful, creates a list 27 including all predefined service environments 30 including their free time slots and costs. Finally, the OCAV component 26 generates an offering 7 for each of those SEs 30, assigns a price to each offering 7 which is preferably calculated by certain business rules, and publishes it, preferably in an offering catalog. There are different types of offering catalogs: public, semi-public and private.

The resource catalog 9 being used by the OCAV component 26 provides access to descriptions of all available resource types provided by the pool of resources as well as descriptions of service environments 30 which are either assigned to a certain customer (customer-specific service environments) or will be offered to a customer (predefined service environment descriptions). Each service environment is described by all resource types including references to their assigned resources needed for a specific SE. Furthermore, it contains information on how to manage those resources in order to fulfill the conditions of that specific SE, how to handle situations like resource shortages or resource overprovisioning, and the appropriate assigned resource management actions like configuring or installing of said resources.

In more detail, there are base resource types as well as complex aggregated resource types are described in the resource catalog.

Base resource types contain references to certain programs (interpretable tasks) which are able to execute the resource management actions (e.g. create/delete) for these resources, interface information for said programs, and additional data necessary to manage the resources by a resource management system.

For example the base resource type "server system" is described by a reference to its resource management actions. These resource management actions are interpretable tasks such as creation and deletion of a resource in machine-readable form. For example such an action may be described by a uniform resource locator (URL) which references a Web service. The base resource type definitions and the corresponding management actions may be provided by the resource manufacturer or the service provider itself.

Besides these base resource types, the resource catalog contains categorized aggregated resource types, which provide several abstraction levels within the resource catalog. Again, these aggregated resource types may be provided by certain resource manufactures or created by the service provider according to its needs.

An aggregated resource type contains references to one or more other resource types with certain parameters for them or a certain combination of them or both. E.g. an aggregated resource type 'HIGH-SECURE FIREWALL' may reference to the 'STANDARD FIREWALL' with configuration parameter to only open port 80, where 'MEDIUM-SECURE FIREWALL' references the same 'STANDARD FIREWALL' but with configuration parameters to open ports 80 and 1024. An example where multiple resource types are referenced is the aggregated resource type 'SECURE WEBSERVER' which may reference a 'WEBSERVER' resource type and a 'FIREWALL' resource type with their appropriate parameters.

Figure 2B:
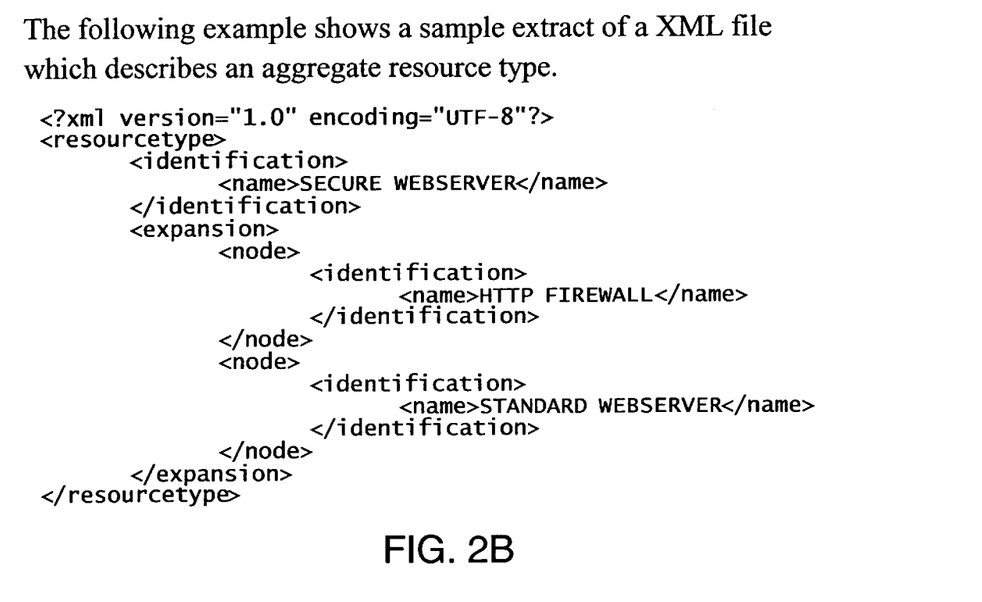
FIGS. 2B-2C show specific implementations of the resource catalog which is preferably used by the present invention.
Figure 2C:
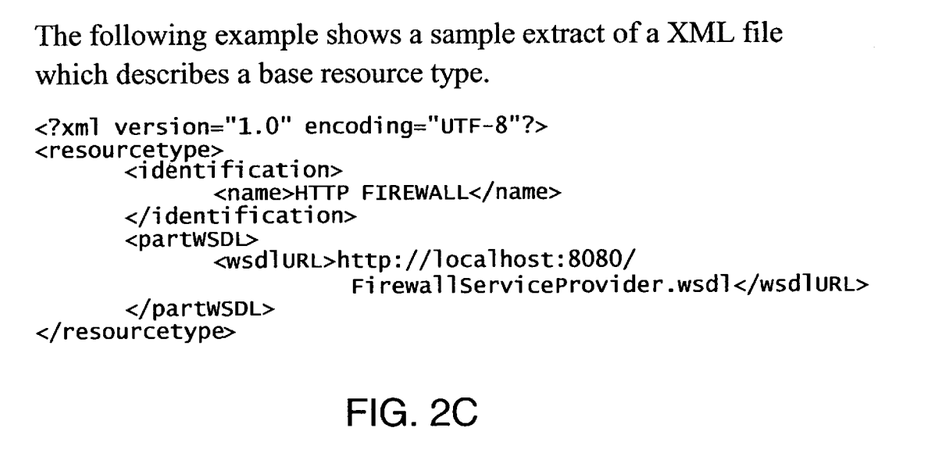

FIGS. 2B and 2C show examples of the categorization of resources. The categories are used to build higher abstracted resource. Technical details such as base resource types and their configuration parameters are hidden on the higher abstraction levels and are represented by categorization information (such as 'SECURE' or 'UNSECURE').

The resource catalog is preferably implemented as a certain table in a database or even just as a plain XML file or files. FIG. 2B shows a sample extract of such a XML file which defines an aggregated resource type 'SECURE WEBSERVER', which consists of a HTTP FIREWALL and a STANDARD WEBSERVER. FIG. 2C shows a sample extract of such a XML file which describes a base resource type 'HTTP FIREWALL'.

In order to participate of a resource type in the inventive OCAV component 26, the respective resource types with their referenced management actions (e.g. create, delete etc.) need to be extended to manage and provide access to usage information (reserved, free, used time slots) of their assigned resources and the respective cost for each of those resource types.

The existing resource management actions 11 (e.g. delete, create, etc) for resource types are extended to provide access to a timetable 20 including free, used and reserved time slots for all resources.

The timetable 20 can be preferably queried from the respective resource type by the getTimeTable resource management action 19. This action returns a timetable 20 for all resources of the resource type for a given time frame. A time frame is specified by the parameters startTime and endTime.

The timetable 20 contains entries for each resource of respective resource type. Each resource 17 is represented by an entry in the timetable 20.

Entries are filled in time slots whenever:

A resource is reserved for a service environment. Reservation is a resource management action that does not involve the resources themselves. It does not necessarily mean that the resource is used within that time frame, A resource is assigned to a service environment. Assignment of a resource means that the resource is used within the service environment. Unassigned and unreserved resources are marked as free.

The timetable 20 can be implemented as a database table where each row of the table represents a resource and the columns represent free, used and reserved time slots or as an XML file.

Furthermore, the resource management actions for the resource types are extended by a getCost resource management action 23 to calculate cost for a resource for a given free time slot. This resource management action returns the cost 25 assigned to a specific resource of a resource type. The result of this getCost resource management action may have an XML structure.

Figure 3A:
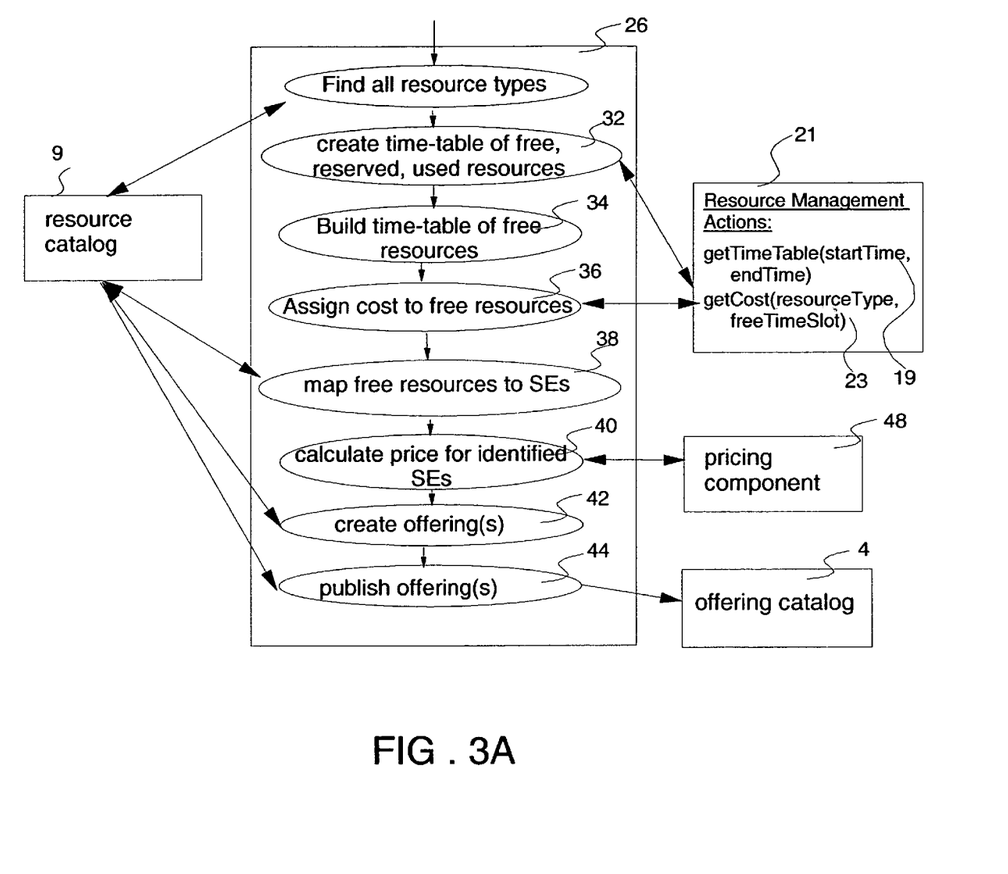
FIG. 3A shows a flow diagram with the inventive method steps executed by the OCAV component.

The latter process of creation of an offering based on a list including the resource types with their assigned resources, their respective free time slots, and their costs is described in more detail with respect to FIG. 3A.

A resource type can assign cost for a resource and a given time frame either statically by returning a fixed cost that has been assigned to a resource type by the provider of the resource type or dynamically by executing a calculation algorithm.

The resource management actions themselves may be included in the resource catalog 9 or may be included in a separate resource management action catalog 21.

These resource management actions 11, 19, 23 which are referenced by a resource management actions catalog are a collection of items of interpretable tasks. These tasks may be references to resource-specific installation and/or configuration programs or may be just described by the URL pointing to a Web service.

Finally, as described in the method below, these individual tasks for each resource are combined into a specific Service Environment task. To be machine-readable, that composite task may be described using workflow technology, with all the resource-specific subtasks which are individual activities in the workflow. The workflows itself may be described using e.g. an XML file according to the BPEL (Business Process Execution Language). This workflow description can be deployed into the workflow engine of the resource management system 10 and executed as needed, The whole creation and operation of the service environment can be done by an autonomous resource management system which is not part of that invention. In order to meet the service environment, the resource management system must be configured with service environment-specific definitions, which are the resource management actions for the specific service environment.

The lifetime of a provisioned service environment can vary from days over weeks to months depending on the concrete scenario. This creates unused capacity for service providers.

The inventive OCAV component is the means to bring unused capacity to consumers.

The present invention may be preferably used in the following application areas: (1) Web serving environments, where an extension of the available capacity for special peek loads is required; (2) media companies that need extension to streaming capacity for upcoming video streaming events; (3) software development companies, where application development and testing departments require test systems such as zSeries Linux images on short term notice; and (4) BioGrid companies that require additional capacity for peek loads during heavyweight calculation processes.

A typical scenario for using the present invention may be a Web fashion shop.

The shop wants to set up a special advertising and promotion action before Christmas. Therefore it needs an extension to its existing Web capacity within a week for the following two weeks at best price. Afterwards this capacity is no longer needed.

With the proposed inventive OCAV component, the capacity planning at the fashion shop may contact the service provider and look for the cheapest offering for the appropriate time frame.

Consider now the service provider who offers unused capacity on short term notice to consumers.

The fashion shop contacts the service provider's site, selects an appropriate offering depending on time frame and price and subscribes to it. The service provider provisions the required Web capacity for the subscribed time frame.

With respect to FIG. 3A, there is depicted a flow diagram with the inventive method steps executed by the OCAV component 26.

Method Step 32: Build Timetable of Free Time Slots for Resource Types/Resources 32

As a first step, the OCAV component 26 identifies all resource types included in the resource catalog 9. To create a timetable of free, reserved and used time slots of all resources for each resource type (step 32), the resource management action getTimeTable 19 for each resource type is invoked. It provides the timetable including free, reserved and used time slots.

The OCAV component 26 iterates through the list of base resource types for a time frame defined by the parameters startTime and endTime of the getTimeTable resource management action.

FIG. 3B shows a sample extract of a timetable in XML which describes base resource types, their assigned resources, and their respective reserved, used and free time slots.

As a next step 34, these timetables 20 are processed to identify the common free time slots of all resources contained in the timetable.

As a result a new timetable 22 is created including all resource types and their assigned resources which have a common free time slot.

FIG. 3C shows a sample extract of a timetable from step 22 in XML including all resource types and their assigned resources which have a common free time slot.

Method Step 36: Assign Cost to Free Resources of the Existing Timetable

The next step 36 is to assign costs to the identified free resources in the new timetable. This is done by querying the cost for the free resources by invoking the getCost resource management action 23. This action returns costs for all resource types which are preferably included in the new timetable.

As a result, a final timetable 24 is created including all resource types, their assigned resources which have a common free time slot, and their assigned respective costs.

FIG. 3D shows a sample extract of a final timetable in XML including all resource types, their assigned resources which have a common free time slot, and the respective costs.

Method Step 38: Map Free Identified Resources Included in the Final Timetable to Predefined Service Environments Now, the free resources included in the final timetable are mapped to pre-defined SEs by iterating through the final timetable. Preferably, the SEs have an identifier allowing mapping of free resources to that specific SE.

For each SE, each resource type entry of this final timetable is checked against the result generated in the step described above. The mapping could be done by resource type and resource name.

As a result of the mapping step 38, a SE list may be generated including all successfully mapped SEs, their free time slots, and their costs 25.

FIG. 3E shows a sample extract of a SED list in XML.

The cost which is assigned to a mapped SE is usually the sum of the costs for the free resources referenced by the SE.

Method Step 40: Associate Prices With the Mapped Service Environments

Each of the service environments has already a cost assigned. However, the final price calculation depends on the service providers business rules.

That is, in addition to assigning cost to an identified, mappable SE, the OCAV component calculates a price for each mapped SE which is included in the list. It may interact with a separate pricing component 48.

Method Step 42: Create Offerings for all Mapped SEs

After a price has been assigned to the mapped SEs, the final offering is generated (step 42) and then published (step 44).

The generated offering may be an XML file itself. Then, the offering is published (step 44) to a public, private or semi-public offering catalog 4. In the case where the IT services are provided by a broker, the brokers may be informed about new available offerings, e.g. via email.

While a particular embodiment has been shown and described, various modifications and extensions will be apparent to those skilled in the art.

What is claimed is:

1. A method for dynamically and automatically setting up offerings for IT services by a service provider, said method comprising the steps of:

identifying, at a server of the service provider, resource types that are part of the service provider's resource infrastructure, wherein each IT service to be offered to a customer is described by a service environment description, wherein each service environment description defines the resource types needed to execute a corresponding service environment, wherein said service environment descriptions as well as descriptions for the resource types available in the service provider's resource infrastructure are included in a resource catalog;

creating, at the server, a timetable for each resource that indicates when each resource is available;

accessing the timetable for each of the identified resource types to identify resource types sharing a common free time slot with other resource types;

automatically comparing the identified resource types sharing a common free time slot to said service environments described in the resource catalog; and creating an offering for at least one of the service environments based on the identified resource types sharing a common free time slot matching the resource types needed to execute the at least one or more of the service environments.

2. A method according to claim 1, further comprising the steps of: calculating a cost for each resource type sharing a common free time slot; and assigning said cost to said respective resource type.

3. A method according to claim 1, further comprising the steps of: calculating an overall cost for each service environment which is successfully mapped to said resource types having a common free time slot; and assigning said overall cost to said respective service environment.

4. A method according to claim 3, further comprising the steps of: calculating a price for each service environment by using a service provider's business rules; and assigning said price to said respective service environment.

5. A method according to claim 4, further comprising the steps of: creating an offering for each service environment including said assigned price; and publishing said offering.

6. A method according to claim 1, wherein said service environments contain a mapping identifier which allows one to use the service environments for mapping.

7. A method according to claim 1, wherein at least one offering comprise a short-term offerings.

8. A method according to claim 1, further comprising the step of:

publishing said offerings.

9. A computer program product stored in the internal memory of a digital computer containing program code that when executed by the digital computer causes the digital computer to dynamically and automatically set up offerings for IT services by a service provider, said computer program product comprising:

program code identifying, at a server of the service provider, resource types that are part of the service provider's resource infrastructure, wherein each IT service to be offered to a customer is described by a service environment description, wherein each service environment description defines the resource types needed to execute a corresponding service environment, wherein said service environment descriptions as well as descriptions for the resource types available in a service provider's resource infrastructure are included in a resource catalog;

program code creating, at the server, a timetable for each resource that indicates when each resource is available;

program code accessing the timetable for each of the identified resource types to identify resource types sharing a common free time slot with other resource types;

program code automatically comparing the identified resource types sharing a common free time slot to said service environments described in the resource catalog; and     program code creating an offering for at least one of the service environments based on the identified resource types sharing a common free time slot matching the resource types needed to execute the at least one or more of the service environments.

\* \* \* \* \*